(12) United States Patent
Sullivan et al.

(10) Patent No.: US 9,401,025 B2
(45) Date of Patent: *Jul. 26, 2016

(54) VISUAL AND PHYSICAL MOTION SENSING FOR THREE-DIMENSIONAL MOTION CAPTURE

(71) Applicant: LUCASFILM ENTERTAINMENT COMPANY, LTD., San Francisco, CA (US)

(72) Inventors: Steve Sullivan, San Francisco, CA (US); Kevin Wooley, San Francisco, CA (US); Brett A. Allen, San Francisco, CA (US); Michael Sanders, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/859,782

(22) Filed: Sep. 21, 2015

(65) Prior Publication Data
US 2016/0012598 A1 Jan. 14, 2016

Related U.S. Application Data

(63) Continuation of application No. 12/506,798, filed on Jul. 21, 2009, now Pat. No. 9,142,024.

(60) Provisional application No. 61/141,970, filed on Dec. 31, 2008.

(51) Int. Cl.
*G09G 5/00* (2006.01)
*G06T 7/00* (2006.01)
(Continued)

(52) U.S. Cl.
CPC .............. *G06T 7/0042* (2013.01); *A63F 13/211* (2014.09); *A63F 13/235* (2014.09);
(Continued)

(58) Field of Classification Search
CPC .......... G06T 2207/10016; G06T 2207/30204; G06T 2207/30196; G06T 7/0042; G06T 7/2086; G03B 15/16; G03B 17/00; G03B 35/00; G06K 9/3216
See application file for complete search history.

(56) References Cited

U.S. PATENT DOCUMENTS 5,790,124 A     8/1998  Fischer
5,831,260 A  *  11/1998  Hansen ................ A61B 5/1114
                                                    250/215

(Continued)

FOREIGN PATENT DOCUMENTS

EP      1946243 A2    7/2008
JP      09-084691     9/1998
(Continued)

OTHER PUBLICATIONS

Examination report from the United Kingdom Intellectual Property Office for application No. GB0922650.7 dated Apr. 9, 2014.
(Continued)

*Primary Examiner* — Kumar Patel
*Assistant Examiner* — Insa Sadio
(74) *Attorney, Agent, or Firm* — Kilpatrick Townsend & Stockton LLP

(57) ABSTRACT

A system includes a visual data collector for collecting visual information from an image of one or more features of an object. The system also includes a physical data collector for collecting sensor information provided by at one or more sensors attached to the object. The system also includes a computer system that includes a motion data combiner for combining the visual information the sensor information. The motion data combiner is configured to determine the position of a representation of one or more of the feature in a virtual representation of the object from the combined visual information and sensor information. Various types of virtual representations may be provided from the combined information, for example, one or more poses (e.g., position and orientation) of the object may be represented.

17 Claims, 6 Drawing Sheets

(51) Int. Cl.

| | | |
|---|---|---|
| *G06K 9/32* | (2006.01) | |
| *A63F 13/211* | (2014.01) | |
| *A63F 13/235* | (2014.01) | |
| *A63F 13/825* | (2014.01) | |
| *G06K 9/00* | (2006.01) | |
| *G06T 7/20* | (2006.01) | |

(52) U.S. Cl.
CPC .......... *A63F13/825* (2014.09); *G06K 9/00342* (2013.01); *G06K 9/3216* (2013.01); *G06T 7/2033* (2013.01); *G06T 2207/10016* (2013.01); *G06T 2207/30196* (2013.01); *G06T 2207/30204* (2013.01)

(56) References Cited

U.S. PATENT DOCUMENTS

| | | | |
|---|---|---|---|
| 5,932,417 | A | 8/1999 | Birnbaumer et al. |
| 6,072,496 | A | 6/2000 | Guenter et al. |
| 6,115,052 | A | 9/2000 | Freeman et al. |
| 6,166,811 | A | 12/2000 | Long et al. |
| 6,208,348 | B1 | 3/2001 | Kaye |
| 6,324,296 | B1 | 11/2001 | McSherry et al. |
| 6,353,422 | B1 | 3/2002 | Perlman |
| 6,438,255 | B1 | 8/2002 | Lesniak |
| 6,515,659 | B1 | 2/2003 | Kaye et al. |
| 6,522,332 | B1 | 2/2003 | Laneiault et al. |
| 6,606,095 | B1 | 8/2003 | Lengyel et al. |
| 6,614,407 | B2 | 9/2003 | Perlman |
| 6,614,428 | B1 | 9/2003 | Lengyel |
| 6,633,294 | B1 | 10/2003 | Rosenthal et al. |
| 6,686,926 | B1 | 2/2004 | Kaye |
| 6,919,892 | B1 | 7/2005 | Cheiky et al. |
| 6,977,630 | B1 | 12/2005 | Donath et al. |
| 7,027,054 | B1 | 4/2006 | Cheiky et al. |
| 7,035,436 | B2 | 4/2006 | Nakamura et al. |
| 7,098,920 | B2 | 8/2006 | Marschner et al. |
| 7,102,633 | B2 | 9/2006 | Kaye et al. |
| 7,116,323 | B2 | 10/2006 | Kaye et al. |
| 7,116,324 | B2 | 10/2006 | Kaye et al. |
| 7,129,949 | B2 | 10/2006 | Marschner et al. |
| 7,164,718 | B2 | 1/2007 | Maziere et al. |
| 7,184,047 | B1 | 2/2007 | Crampton |
| 7,212,656 | B2 | 5/2007 | Liu et al. |
| 7,292,261 | B1 | 11/2007 | Teo |
| 7,433,807 | B2 | 10/2008 | Marschner et al. |
| 7,450,126 | B2 | 11/2008 | Marschner et al. |
| 7,535,472 | B2 | 5/2009 | Kim et al. |
| 7,554,549 | B2 | 6/2009 | Sagar et al. |
| 7,605,861 | B2 | 10/2009 | LaSalle et al. |
| 7,848,564 | B2 | 12/2010 | Sullivan et al. |
| 8,019,137 | B2 | 9/2011 | Sullivan et al. |
| 8,130,225 | B2 | 3/2012 | Sullivan et al. |
| 8,144,153 | B1 | 3/2012 | Sullivan et al. |
| 2001/0024512 | A1 | 9/2001 | Yoronka et al. |
| 2001/0033675 | A1 | 10/2001 | Maurer et al. |
| 2002/0041285 | A1 | 4/2002 | Hunter et al. |
| 2002/0060649 | A1 | 5/2002 | Pearlman |
| 2004/0063481 | A1 | 4/2004 | Wang |
| 2004/0119716 | A1 | 6/2004 | Park et al. |
| 2004/0155962 | A1 | 8/2004 | Marks |
| 2004/0161132 | A1 | 8/2004 | Cohen et al. |
| 2004/0179008 | A1 | 9/2004 | Gordon et al. |
| 2005/0078124 | A1 | 4/2005 | Liu et al. |
| 2005/0099414 | A1 | 5/2005 | Kaye et al. |
| 2005/0104878 | A1 | 5/2005 | Kaye et al. |
| 2005/0104879 | A1 | 5/2005 | Kaye et al. |
| 2005/0146521 | A1 | 7/2005 | Kaye et al. |
| 2005/0231505 | A1 | 10/2005 | Kaye et al. |
| 2006/0055699 | A1 | 3/2006 | Perlman et al. |
| 2006/0055706 | A1* | 3/2006 | Perlman .................. A63F 13/06 345/589 |
| 2006/0067573 | A1 | 3/2006 | Parr et al. |
| 2006/0126928 | A1 | 6/2006 | Edwards et al. |
| 2006/0157640 | A1 | 7/2006 | Perlman et al. |
| 2006/0192785 | A1 | 8/2006 | Marschner et al. |
| 2006/0192854 | A1 | 8/2006 | Perlman et al. |
| 2006/0228101 | A1 | 10/2006 | Sullivan et al. |
| 2007/0052711 | A1 | 3/2007 | Gordon et al. |
| 2007/0081695 | A1 | 4/2007 | Foxlin et al. |
| 2007/0091178 | A1 | 4/2007 | Cotter et al. |
| 2007/0126743 | A1* | 6/2007 | Park ........................ G06F 3/011 345/474 |
| 2007/0133841 | A1 | 6/2007 | Zhang et al. |
| 2008/0100622 | A1 | 5/2008 | Gordon |
| 2008/0170077 | A1 | 7/2008 | Sullivan et al. |
| 2008/0170078 | A1 | 7/2008 | Sullivan et al. |
| 2008/0170777 | A1 | 7/2008 | Sullivan et al. |
| 2008/0180448 | A1 | 7/2008 | Anguelov et al. |
| 2009/0209343 | A1 | 8/2009 | Foxlin et al. |
| 2010/0002934 | A1 | 1/2010 | Sullivan et al. |

FOREIGN PATENT DOCUMENTS

| | | |
|---|---|---|
| WO | 2004/041379 | 5/2004 |
| WO | 2007/044301 A2 | 4/2007 |
| WO | 2009/007917 A2 | 1/2009 |

OTHER PUBLICATIONS

Examination report from Australian Patent Office for application No. 2009251179, dated Jan. 20, 2014, 5 pages.
Examination report from European Patent Office for application No. GB0718003.7, dated Aug. 3, 2009, 2 pages.
Examination report from New Zealand Patent Office for application No. 561570, dated Jul. 7, 2009, 2 pages.
International Search Report and Written Opinion for PCT Application No. PCT/US2006/009787, dated Oct. 29, 2007, 12 pages.
International Preliminary Report on Patentability for PCT Application No. PCT/US2006/009787, dated Nov. 13, 2007, 9 pages.
Examination Report from New Zealand Patent Office for Application No. 581496, dated Dec. 2, 2009, 2 pages.
Examination Report from United Kingdom Patent Office for Application No. PCT/US2006/009787, dated Aug. 3, 2009, 2 pages.
Examination Report from New Zealand Patent Office for Application No. 561570, dated Dec. 18, 2009, 1 page.
Examination Report from New Zealand Patent Office for Application No. 582356, dated Jan. 7, 2010, 2 pages.
Search Report from United Kingdom Intellectual Property Office for application No. GB0922650.7, dated Apr. 20, 2010, 2 pages.
Stopford, Office Action issued in AU application No. 200924084 7 mailed Nov. 23, 2011, 4 pages.
Agarwala, Aseern, "Keyframe-Based Tracking for Rotoscoping and Animation," ACM SIGGRAPH '04 conference proceedings, 2004, pp. 1-8.
Anguelov, Dragomir et al., "SCAPE: Shape Completion and Animation of People." 2005, ACM Inc., pp. 408-416.
Bascle, Blake, "Separability of pose and expression in facial tracking and animation," Jan. 1998, IEEE Computer Society, Proceedings of the Sixth International Conference on Computer Vision, pp. 323-328.
Bespalov, Dmitriy et al., "Local Feature Extraction and Matching Partial Objects." Drexel University, Aug. 6, 2006, pp. 1-30.
Buenaposada, Jose M., "Performance driven facial animation using illumination independent appearance-based tracking," In Proceedings of ICPR, Hong Kong, Aug. 2006, 4 pages.
Chang et al., "Automatic 3D Facial Expression in Analysis in Videos," Proc. IEEE Int'l Workshop Analysis and Modeling of Faces and Gestures (AMFG '05), vol. 3723, pp. 293-307, 2005.
Curio, Cristobal et al., "Semantic 3D Motion Retargeting for Facial Animation." ACM Jul. 28-29, 2006, pp. 77-84, 176.
Debevec, et al. "Acquiring the Reflectance Field of a Human Face," SIGGRAPH 2000 Conference Proceedings, pp. 1-12, 2000.
Deng et al., Animating blendshape faces by cross-mapping motion capture data,: In Proceedings of the 2006 Symposium on Interactive 3D Graphics and Games (Redwood City, California, Mar. 14-17, 2006). I3D '06. ACM, New York, NY, 4348.
Furukawa et al., "Dense 3D Motion Capture from Synchronized Video Streams," [online], [retrieved on Aug. 26, 2009]. Retrieved

(56) References Cited

OTHER PUBLICATIONS from the Internet <URL: http://www.cs.washington.edu/homes/furukawa/papers/cvpr08b.pd>, 8 pages.

Gleicher, Michael, "Animation From Observation: Motion Capture and Motion Editing," Computer Graphics 33(4), 1999, pp. 1-5.

Grung and Manne, "Missing values in principal component analysis," Chimometrics and Intelligent Laboratory Systems, 1998, 42:125-139.

Heap and Hogg, "Towards 30 Hand Tracking using a Deformable Model," Proceedings of the Second International Conference on Automatic Face and Gesture Recognition, 1996, pp. 140-145.

Heck, Rachel, et al., "Splicing Upper-Body Actions with Locomotion." Eurographics 2006, vol. 25 (2006), No. 3, pp. 459-466.

Herda et al., "Skeleton-Based Motion Capture for Robust Reconstruction of Human Motion," Computer Animation 2000 Proceedings, 2000, pp. 77-83.

Horprasert et al., "Real-time 3D Motion Capture," Second workshop on Perceptual Interfaces, San Francisco, Nov. 1998, 4 pages.

Heseltine, Thomas et al., "Three-Dimensional Face Recognition an Eigensurface Approach." 2004 International Conference on Image Processing (ICIP), pp. 1421-1424.

Lin et al., "Extracting 30 Facial Animation Parameters from Multiview Video Clips," IEEE Computer Graphics and Applications, 2002, 22(6):72-80.

Majkowska, A. et al., "Automatic splicing for hand and body animations." 2006. In Proceedings of the 2006 ACM SIGGRAPH/Eurographics symposium on Computer animation (SCA '06). Eurographics Associate, Aire-la-Ville, Switzerland, Switzerland, pp. 309-316 and 369.

Markoff, "Camera System Creates Sophisticated 3-0 Effects" [online], New York Times, Jul. 31,36 2006, [retrieved on Jul. 31, 2006]. Retrieved from the Internet: <URL: www.nytimes.com/2006/0731/technology/31motion.html>, 4 pages.

Park, S. et al., "Capturing and Animating Skin Deformation in Human Motion." ACM 2006, pp. 881-889.

Parke, F., "Computer Generated Animation of Faces," Aug. 1972, SIGGRAPH 1972, pp. 451-457.

Preteux, Francoise et al., "Model-Based Head Tracking and 3D Pose Estimation." Sep. 24, 1998, Institut National des Telecommunications, 15 pages.

Wren et al., Dynamic Models of Human Motion,: [online], 1998, [retrieved on Aug. 26, 2009]. Retrieved from the Internet <URL: http://www.drwren.com/chris/dyna/TR-415.pdf>, 6 pages.

Zhang, Qingshan et al. "Geometry-Driven Photorealistic Facial expression Synthesis," IEEE Transactions on Visualization and Computer Graphics, vol. 12, No. 1, Jan./Feb. 2006, pp. 48-60.

* cited by examiner

VISUAL AND PHYSICAL MOTION SENSING FOR THREE-DIMENSIONAL MOTION CAPTURE

CLAIM OF PRIORITY

This application is a continuation of U.S. patent application Ser. No. 12/506,798, filed Jul. 21, 2009, and entitled, "VISUAL AND PHYSICAL MOTION SENSING FOR THREE-DIMENSIONAL MOTION CAPTURE," which claims priority to U.S. patent application Ser. No. 61/141,970, filed on Dec. 31, 2008, the entire contents of which are hereby incorporated by reference.

TECHNICAL FIELD

This document relates to combining physical and visual information for three-dimensional motion capture.

BACKGROUND

Motion capture techniques allow motion data to be generated based on tracking and recording the movement of real objects. For example, a realistic sequence of motion, e.g., by a human actor, can be captured and used to drive the motion of an animated object. To capture such motion with conventional systems, an actor wears a body suit (e.g., black colored) that is attached with retro-reflective objects (e.g., balls) at locations that correspond to the actor's joints, e.g., shoulder, elbow, wrist. As the actor performs, a sequence of movements are digitally recorded by a number of cameras and processed to identify the retro-reflective balls as points, upon which, triangulation can be used to determine the three-dimensional position of the point. A virtual skeleton representing an actor can be fitted to such point movement collected over time to represent the motion of the actor.

SUMMARY

The systems and techniques described here relate to combining visual information provided from one or more images with sensor information. From the combined information, the position of object features represented in the image (or images) may be determined.

In one aspect, a system includes a visual data collector for collecting visual information from a first image of at least a first feature of an object. The system also includes a physical data collector for collecting sensor information provided by at least one sensor attached to the object. The system also includes a computer system that includes a motion data combiner for combining the visual information the sensor information. The motion data combiner is configured to determine the position of a representation of the first feature in a virtual representation of the object from the combined visual information and sensor information. Various types of virtual representations may be provided from the combined information, for example, one or more poses (e.g., position and orientation) of the object may be represented.

Implementations may include any or all of the following features. For example, the motion data combiner may be configured to determine the position of the first feature in a second image based upon the sensor information provided by the sensor. The motion data combiner may also be configured to determine a region of the second image likely to include a representation of the first feature based upon the sensor information provided by the sensor. The motion data combiner may be configured to track the movement of the first feature based upon the position of the first feature in the first image and the position of the first feature in the second image. The motion data combiner may be configured to determine the initial position of a second feature from the sensor information provided by the sensor. The motion data combiner may use the visual information to define a pose of the object produced by the sensor information from the sensor. The motion data combiner may use the combined visual information and sensor information to produce a pose representative of the object. The virtual representation of the object may represents a pose of the object during collection of the visual information and the sensor information. The object may be capable of covering a portion of a body, may be a camera, or may take another form. The motion data combiner may be configured to synchronize the visual information and the sensor information to combine the visual information and the sensor information. The inertial sensor may be an inertial sensor. The sensor information may include a time series of data provided by the sensor.

In another aspect, a computer-implemented method includes combining visual information from a first image of at least a first feature of an object and sensor information provided by at least one sensor attached to the object. The method also includes determining the position of a representation of the first feature in a virtual representation of the object from the combined visual information and sensor information.

In another aspect, a computer program product tangibly embodied in an information carrier and comprising instructions that when executed by a processor perform a method that includes combining visual information from a first image of at least a first feature of an object and sensor information provided by at least one sensor attached to the object. The method also includes determining the position of a representation of the first feature in a virtual representation of the object from the combined visual information and sensor information.

In still another aspect, a system includes a visual data collector for collecting visual information from a plurality of images. Each image includes content that represents a plurality of markers attached to a body suit. The system also includes a physical data collector for collecting sensor information provided by a plurality of inertial sensors also attached to the body suit. The system also includes a computer system that includes a memory for storing the collected visual information and sensor information. The computer system also includes a processor for executing instructions that perform a method that includes combining the visual information and the sensor information. The method also includes determining, for each image, the respective positions of representations of the plurality of markers in a virtual representation of a pose provided by the body suit from the combined visual information and sensor information.

Details of one or more implementations are set forth in the accompanying drawings and the description below. Other features, aspects and advantages will be apparent from the description and drawings, and from the claims.

DESCRIPTION OF DRAWINGS

Like reference symbols in the various drawings indicate like elements.

DETAILED DESCRIPTION

Figure 1:
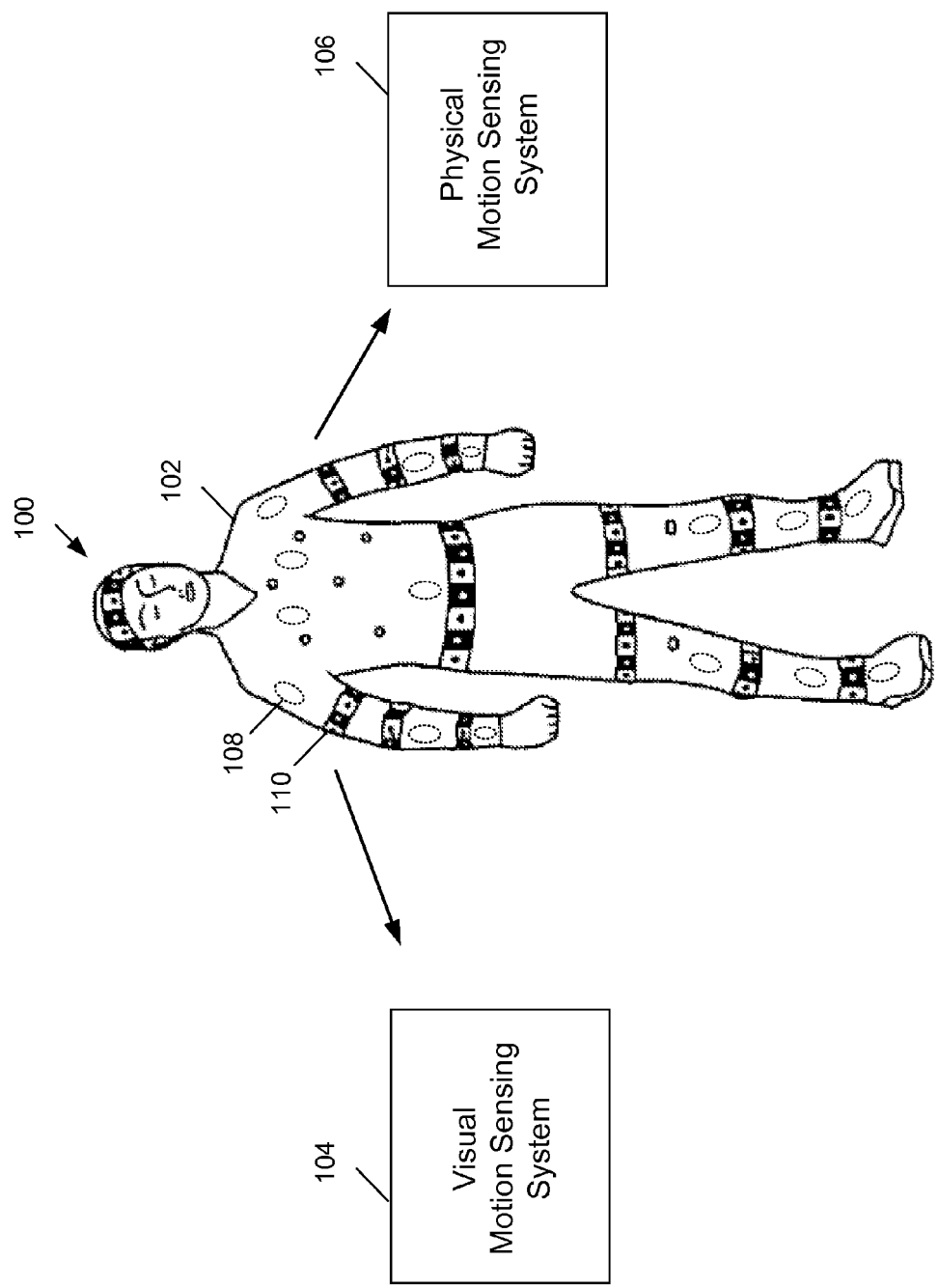
FIG. 1 illustrates an individual wearing a motion capture body suit.

Referring to FIG. 1, an individual 100 (e.g., an actor) is illustrated wearing a body suit 102 that includes a series of bands (e.g., rigid or semi-rigid support structures) with markers that may be detected by one or more camera(s) included in a motion capture system. The bands, in turn, are attached to an underlying object, the actor 100 or the body suit 102 of the actor. A band that is a rigid structure is one in which the movement of the markers on a same support structure is negligible relative to the markers' positions from each other. Additionally, a band that is a semi-rigid structure is one in which the movement of the markers on a same support structure is permitted, but the movement is substantially limited within a predetermined range. The amount of the movement between the markers may be based on several factors, such as the type of material used in the support structure and the amount of force applied to the support structure. For example, a flexible body suit, depending on materials used and methods of construction, may qualify as a "rigid" or "semi-rigid" support structure provided that it demonstrates the appropriate level of rigidity. Additionally, bands may be attached separate from the suit such as a headband, incorporated in to gloves, shoes, etc., which may also qualify as rigid or semi-rigid support structures. Other types of visual markers may be implemented independently or in combination with the bands. For example, retro-reflective spheres and other types of visual markers may be incorporated into the body suit 102.

In some arrangements, one or more other techniques may be implemented to collect visual information, which may be used independently or in concert with visual marking technique (e.g., bands) illustrated in the figure. Features and existing markings of an object may be used to provide visual information. For example, features of the body suit 102 (e.g., colors, patterns, etc.) or other type of clothing may be used to visually indicate movement of the actor 100. Visual information may also be provided by physical features of the actor 100 (or other type of object). For example, the movement of natural features such as appendages (e.g., arms, legs, etc.), digits (e.g., fingers) and other portions of the actor (e.g., hair, etc.) may be used to provide visual information. As such, visual information may be collected with or with our using a body suit. Similarly, bands may not be implemented, for example, and sufficient visual information may be provided by the body suit 102 (e.g., from one or more patterns and colors incorporated into the body suit). In another arrangement, visual markers may be attached directly to the actor 100 to provide visual information. For example, markers of one or more sizes may be attached to various portions of the body of the actor (e.g., face, hands, arms, legs, feet, torso, etc.). Such visual information may be independently used or together with visual information provided from markers attached to the actor's clothing, such as the body suit 102. Other types of visual information may also be captured and used. For example, the visual boundary between an object and a background (e.g., a silhouette) may be captured and provide visual information that represents the pose and motion of an object. As such, one or more silhouettes of the actor 100 or other type of occluding contours may be used for providing visual information.

In some systems, one or more cameras capture two-dimensional (2D) images of the actor 100 or other types of object in motion. As such, ambiguity may be introduced by motion that is weakly observed or even undetectable in the 2D images, for example, when the actor moves directly toward or away from the camera. Such ambiguity can be reduced with incorporating multiple cameras, e.g., twenty cameras, into the motion capture system. However, situations may occur in which the markers of the body suit 102 or other features are undetectable. For example, if the markers or features are visually obscured (e.g., the actor 100 is immersed in smoke or other type of substance) the it may be difficult detect, let alone track the individual markers. Due to such detection gaps, a virtual representation of the actor (produced from the captured data) may include artifacts in the form of physically impossible motions in an attempt to produce appropriate three-dimensional (3D) points. For example, a leg can suddenly appear to rotate many degrees from one frame to the next frame. While dramatic changes can be easy to spot, subtle mistakes may be difficult to catch.

To reduce such ambiguities, inertial sensors are attached to the actor 100, the body suit 102 or other articles of the actor's clothing. In general, the inertial sensors capture motion information that can be combined with the motion information provided by the visual information from the markers, features, or combination. For illustration, the motion information captured from the markers is provided to a visual motion sensing system 104 and the motion from the inertial sensors is provided to a physical motion sensing system 106. By using the two sets of motion information in aggregate, estimations of the 3D location and orientation of the skeleton is improved while spatial ambiguities can be reduced. As such, the collected visual and sensor information may be used in combination to increase accuracy for determining poses (e.g., position, orientation) of an object (e.g., the actor) Additionally, other applications such as tracking and marker (or feature) identification may be improved.

Along with the using the inertial information to improve the accuracy of the visual information, the visual information can also be used to complement the inertial information such as providing a relatively global position and orientation. For example, if the actor's performance included climbing a ladder, the inertial sensors (of the motion sensing system 106) might be unable to accurately recover the actor's vertical translation (up the ladder) and simply result in poses that represent the actor climbing in place. By including the global position and orientation from the visual information, the appropriate vertical translation can be incorporated to provide realistic poses of the actor. As such, the visual information can assist calibrating drift that appears in the inertial information. In another example, while in a canonical T-pose (during inertial information collection), drift in the inertial sensors may appear to show the actor's arms drooping and cause misrepresentations in processed skeleton poses (e.g., arms may appear slightly raised). By calibrating the inertial information with the visual information, one or more offsets may be identified to correct the skeleton poses. Similarly, the visual information may be used for calibrating the information provided from one or more of the sensors.

Various types of sensors may be used to attain position information, for example, inertial sensors (e.g., accelerators, gyroscopes, etc.) or other types of sensors (e.g., magnetometers, etc.) may be incorporated with the body suit 102, individually or in combination. In some arrangements, accelerators may measure acceleration, the direction of gravity, or other quantity. Other types of sensors may measure similar or different quantities, for example, gyroscopes may be used to measure rates of rotation, and magnetometers may be used to measure magnetic fields. One or more thermometers may be used to measure temperatures (e.g., to compensate for drift in one or more sensors). Various sensor packaging techniques may also be implemented, for example, sensors may be incorporated into relatively small physical packages to conserve space, extended through elongated flexible materials (e.g., embedded in flexible tape), or utilize other packaging methodologies. In this particular arrangement, one type of inertial sensor (e.g., illustrated with circular representations such as circle 108) are distributed throughout the body suit 102 to provide motion information from the torso and extremities of the actor 100. For example, three inertial sensors are positioned to capture the motion of each leg and arm of the actor 100. Further, inertial sensors are positioned to capture motion from the actor's torso. Additionally, sensors may be placed for capturing motion information from other locations, for example, one or more inertial sensors may be placed on the head and neck of the actor, digits (e.g., fingers and toes), and the like.

For this arrangement, the markers (used to provide motion information to the visual motion sensing system 104) may be incorporated into the series of bands (e.g., band 110) wrapped around portions to of the actor 100. In some arrangements, the marker-to-marker spacing on a support structure such as a band may be application specific (e.g., based on the environment), and thus the spacing does not need to be known a-priori. Similar spacing and other types of constraints may also be used for collecting visual information from features (e.g., natural occurring or synthetic) associated with an object. The system can use one or more cameras to track different markers on the support structures (or object features). From the captured visual information, these markers (or features) may be used to estimate the motion (e.g., position and orientation in 3D space through time) of the bands (or the features). The knowledge that each support structure is rigid (or semi-rigid) may also be used in the estimation process and may facilitate reconstruction of the motion.

In some arrangements, the markers can be made of high-contrast materials, and may also optionally be lit with light emitting diodes (LEDs) or luminescent materials that are visible in the dark. These lighting qualities can enable cameras to capture the marks on the object in low lighting or substantially dark conditions. For example, an actor being filmed may walk from a well lit area to a shadowed area. The markers may be captured despite the actor's movement into the shadowed area because the marks glow or emit light.

Various type of materials and fabrics may be used to produce the body suit 102, for example layers of flexible and durable material may be used to produce a suit that can be used over a large range of temperatures and weather conditions (e.g., bright sun, rain, snow, etc.) and be capable of attaching to inertial sensors.

In the present example, markers and inertial sensors are attached to the body suit 102 to provide visual information as well as sensor information. However, other types of objects may be attached with markers and inertial sensors (or other similar devices) for providing visual and sensor information. For example, various types of body coverings may be used in concert with marker and inertial sensors. Various types of costumes, fabrics and covering (e.g., peelable synthetic body paint) may be implemented. In some arrangements, either or both the markers and the sensors may be positioned directly upon a subject's skin (e.g., an actor), fur (e.g., an animal) or other body portion.

Figure 2:
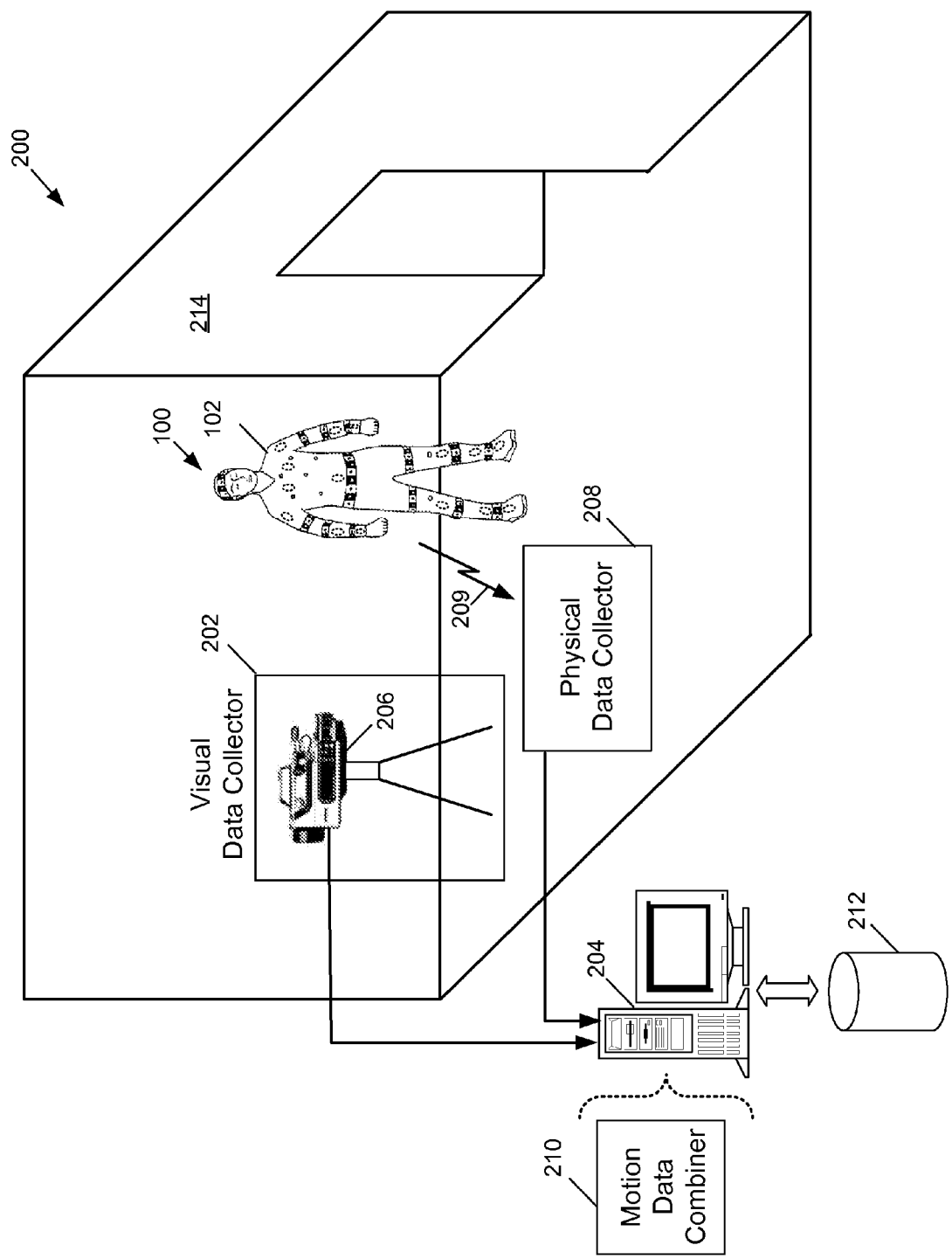
FIG. 2 illustrates a motion capture system.

Referring to FIG. 2, a exemplary environment 200 (e.g., movie studio, sound stage, etc.) is illustrated for collecting visual and physical motion information from the actor 100 wearing the body suit 102. While the environment 200 is depicted as an interior location, in some arrangements the environment may be external (e.g., located outside) or a combination of two types of locations (e.g., for performances that include the actor moving from an interior location to an exterior location).

To collect visual information produced by the actor 100, a visual data collector 202 and a computer system 204 are included in the visual motion sensing system 104 (shown in FIG. 1). In this particular arrangement, the visual data collector 202 includes a camera 206 that is capable of capturing multiple frames of visual information. In general, each frame can be considered as visual sample of a pose of the actor 100 as represented by the markers included body suit 102. From the information captured by the camera 206, the pose can be represented as a set of numerical values that describe how the object (e.g., the actor 100) has moved at a particular instance in time. For example, the pose could include such numerical values that represent the angle of the actor's right elbow, the angle of his left shoulder, the actor's global position and global orientation (relative to the environment 200). Typically, the numerical values that represent the pose are relative to a predefined canonical pose. For example, a pose in which the actor 100 is standing with his both arms pointing horizontally outward (referred to as a "T" pose) may be defined as a canonical pose. While the one camera 206 is illustrated as being included in the visual motion sensing system 104, two or more cameras (which are typically synchronized for image capture) may also be included for capturing visual information from different perspectives. To use the visual data captured by the camera 206, the computer system 204 executes operations that include receiving, processing and outputting data. In some arrangements, the computer system 204 may also execute operations to control one or more operations of the camera(s) (e.g., control data capture rate, adjust camera orientation, etc.). Operations of the computer system 204 may also include computing the location of the camera and its visual properties, such as the camera's field of view, lens distortion, and orientation, while a sequence of images is being recorded. For example, operations of the computer system 204 can derive the position of the camera 206 given enough markers and information associated with the markers, such as the number, identification, and position of the markers captured by the camera 206.

From the markers and patterned bands of the body suit 102 or features of the actor 100, one or more cameras (e.g., camera 206) record the motion of the actor. To determine the pose of the actor 100, the computer system 204 executes operations to identify each marker that is visible in the captured 2D data and assigned a correspondence to the particular marker of the body suit 102 (referred to as tracking) Next, one or more techniques may be used by the computer system 204 identify the pose of the actor 100 (referred to as solving), for example, by finding a pose that minimizes re-projection error of an estimated 3D position of the markers onto the captured image from the camera 206.

Along with collecting the images from the actor 100, information is also collected from the inertial sensors included in the body suit 102. As represented in FIG. 1, data from the sensors is collected and processed by the physical motion sensing system 106. For some arrangements, each senor may collect and provide a sequence of data over a period of time. Such time series of data may be collected, for example, over predefined periods of time, initiated by one or more triggering events (e.g., an actor initiating a performance) or controlled by one or more other data collection techniques. As illustrated in the FIG. 2, the system 106 includes a physical data collector 208 that is capable of receiving motion information from the inertial sensors. In this particular arrangement, a wireless signal 209 is illustrated as providing the information to the physical data collector 206, however, various data transferring techniques and methodologies may be implemented by the physical motion sensing system 106. For example, multiple wireless signals may be implemented (e.g., each sensor may provide collected motion data in a wireless signal). One or more telemetry, modulation, encryption techniques may also be exploited for data transfer. Hardwire connections may also be independently implemented or in concert with various wireless connections (e.g., Bluetooth, Wi-Fi, Infrared, etc.).

Similar to the visual motion sensing system 104, a computing device is used to process the motion data from the inertial sensors of the physical motion sensing system 106. In this particular arrangement, the computer system 204 is also used to process the inertial sensor data, however, such processing may be provided by a separate computer system dedicated to the physical motion sensing system 106, or the processing may be distributed across multiple computers.

By processing the data from the inertial sensors, pose estimates of the actor 100 may be calculated from the data that correspond in time to the images captured by the camera 206. By producing these two synchronized data sets, the inertial data can be combined with the image data to produce a virtual representation of the actor 100 for various applications such as producing an animation for a movie, video game, etc. Such a representation (referred to as a skeleton), can be used to describe the motion of the actor 100 by using a hierarchy of transformations that approximate the true kinematics of the captured object (e.g., the actor 100). Each transformation corresponds to a joint in the actor's body, such as the shoulder, elbow, knee, etc. These transformations are typically located at the center of rotation of each of the anatomical joints. Some skeletal joints may be considered an approximation to anatomical kinematics, for example, joints of the spine may be approximated using two or three rotations and translations. A translation component, which is referred to as a bone, is defined as being located between two or more joints.

Along with the joints and bones, numerical parameters (referred as skeleton parameters) are used to describe the skeleton of the actor 100 (or other subject). In general, skeleton parameters include intrinsic parameters of the skeleton that are substantially constant as the subject moves. For example, skeleton parameters can represent quantities such as the length of the actor's left or right upper arm, lower arm, upper leg, lower leg, etc.

To combine and use the visual data provided by the camera 206 and the inertial data provided by the sensors included in the body suit 102, the computer system 204 may execute one or more processes. For example, a motion data combiner 210 may be executed for combining the data sets and using the data sets to form a skeleton that virtually represents the movement of the actor 100. To assist with execution, a storage device 212 (e.g., hard drive, CD-ROM, etc.) is in communication with the computer system 204 and may be used for storing and retrieving data. Other types of data stores may also be accessed by the computer system 204, for example, data may be accessed from one or more computer networks or from the Internet to assist the processing of the data sets by the motion data combiner 210.

Along with components (e.g., interface cards, etc.) for receiving user input and data from various sources (e.g., the camera 206, the physical data collector 208, the Internet, other computer systems, etc.), the computer system 204 also includes memory (not shown) and one or more processors (also not shown) to execute processing operations. The storage device 212 is capable of storing data (e.g., visual data, inertial motion data, etc.) and providing the stored data to assist production of one or more virtual representations.

Various operations may be executed to combine the inertial data and the visual data. For example, the data sets may be synchronized using one or more methodologies and techniques such as manual synchronization in which a user identifies the time-shift between the inertia data and the visual data. Time-coding techniques may also be used such as a common time signal being associated with each of the data sets. One or more actions from the object being captured (e.g., the actor 100) may also be used as a timing trigger. For example, the actor 100 may perform a predefined action (e.g., waving both arms and jumping up and down) that is clearly identifiable in each data set and used to accurately aligned the data sets.

Figure 3:
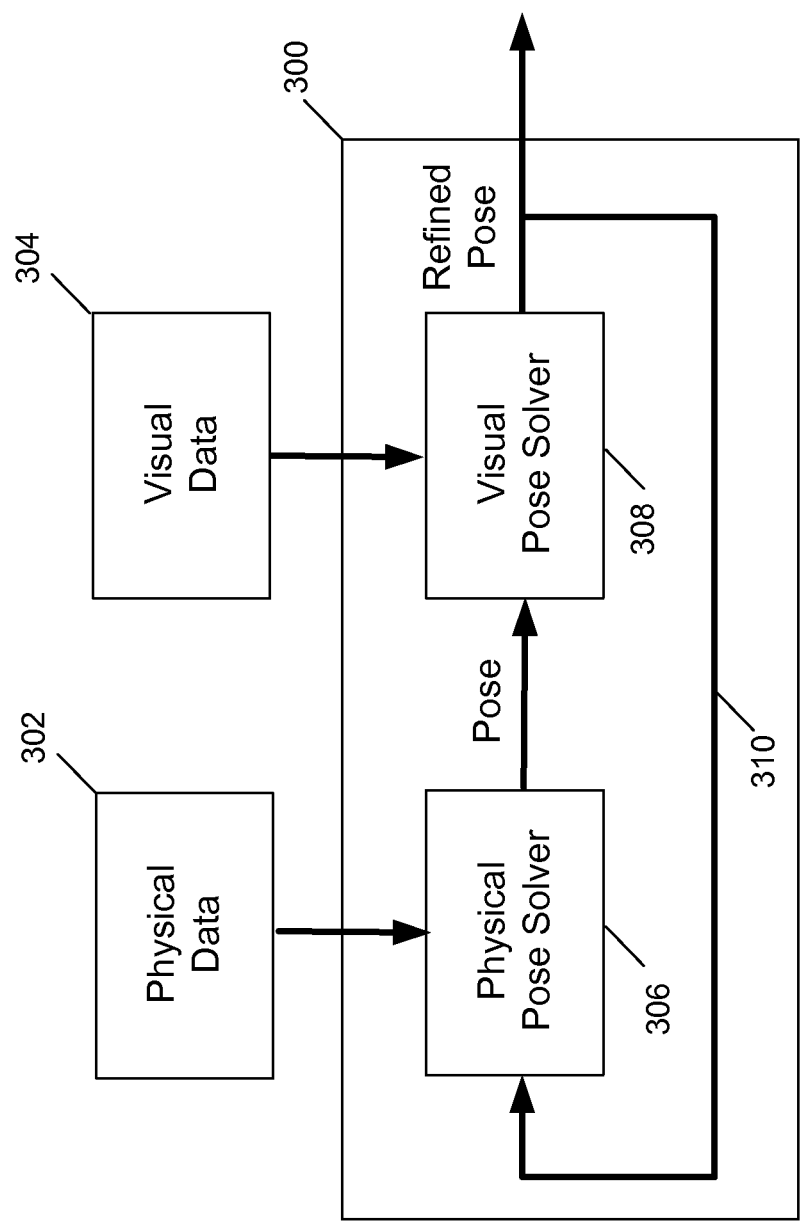
FIGS. 3 and 4 illustrate exemplary motion data combiners.
Figure 4:
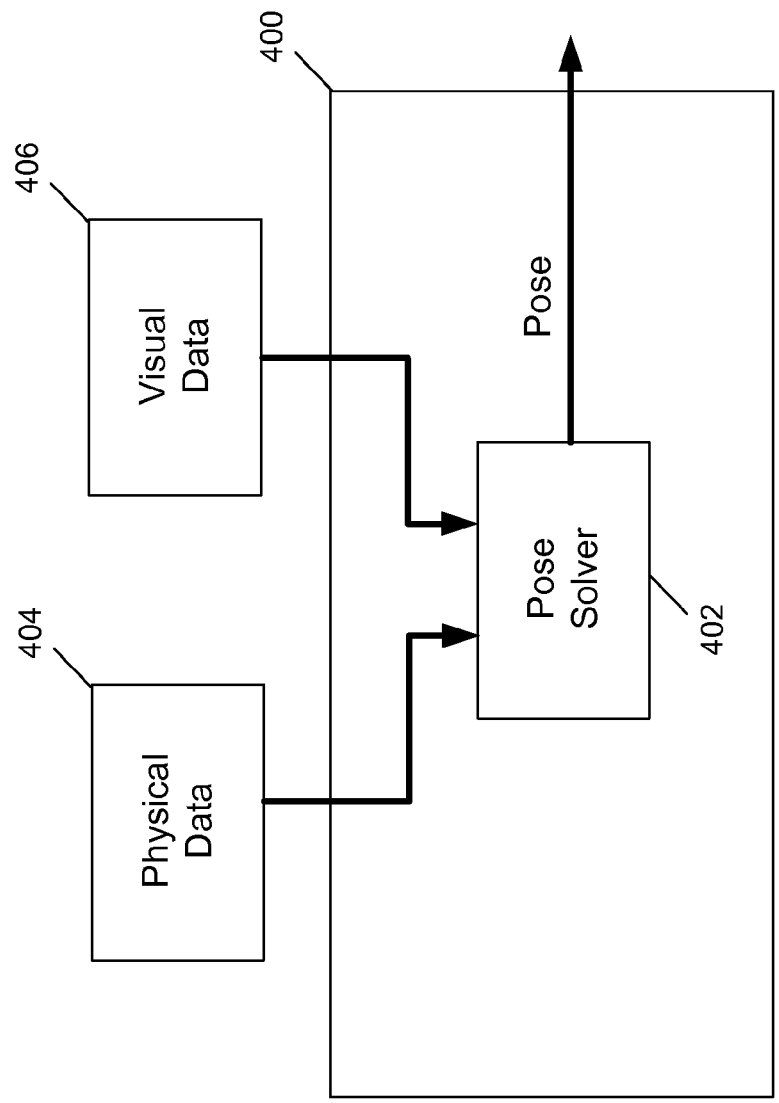

Referring to FIGS. 3 and 4, two exemplary arrangements of the motion data combiner 210 (shown in FIG. 2) are illustrated for combining inertial sensor data and visual data to estimate the 3D location and orientation of a virtual representation of the captured object (e.g., actor 100). Referring to FIG. 3, a motion data combiner 300 operates in a sequential manner to combine physical data 302 (e.g., provided by the inertial sensors of the body suit 102) and the visual data 304 (e.g., provided by the camera 206). In some arrangements, data from multiple sensors (e.g., accelerometers, gyroscopes, magnetometers, thermometers, etc.) may be combined to determine the 3D location and orientation of the virtual representation. In general, the serial architecture of the motion data combiner 300 operates in stages on a frame by frame basis. A physical pose solver 306 receives the physical data 302 and produces a pose estimate for each frame. Once produced, the estimated pose is provided to a visual pose solver 308, which also receives the visual data from the visual motion sensing system (e.g., captured by the camera 206). The visual pose solver 308 uses the pose estimate (from the physical pose solver 306) to provide one or more locations to detect markers and initiate tracking of movement. The pose provided by the physical pose solver 306 may also be used by the visual pose solver 308 to produce a pose representation that includes aspects and features of the capture object that may not be visible by the visual data collector (e.g., the camera 206). The absence of such information in the visual data 304 may be the result of occlusion, object movement not detectable in the two dimensional visual data, or similar phenomena. For example, movements of the actor 100 directly toward or away from the camera 206 (e.g., a slight arm movement toward the camera) may not be detected within the visual data 304. However, the acceleration of one or more of the inertial sensors with the body suit 102 (caused by a slight arm movement) may be detected and represented in the physical data 302.

By using the pose produced from the physical data 302, along with the visual data 304, the visual pose solver 308 can provide a refined pose estimate. In one arrangement, the visual pose solver 308 solves for joint angles that substantially minimize the re-projected error of the markers in the visual data 304. Additionally, the term error that reflects the distance in joint space of the pose provided by the physical data 302 may also be minimized. Further, the pose provided from the physical data 302 can be used by the visual pose solver 308 to restrict joint movement (e.g., a joint angle) over time.

As illustrated with pathway 310, in some arrangements, the refined pose provided by the visual pose solver 308 can be fed back to the physical pose solver 306 for use with data in subsequent fames. For example, the fed back refined pose may be used by the physical data solver 306 to increase the accuracy of initial estimates. Such feedback data could also be used to update one or more models produced by the physical motion sensing system 106. Such updates may implement various techniques, for example, updates could be provided in a direct manner by overriding previous model states with a new estimates, combining previous model states with new estimates (e.g., by using predetermined or continuously updates confidence values), or one or more other similar techniques. In some arrangements, differences (referred to as deltas) between the pose originally produced by the physical pose solver 306 and the refined pose may be identified and stored for later retrieval and application to subsequent pose estimates produced by the physical data solver 306. While the physical pose solver 306 provides the initial pose in the motion data combiner 300, in some arrangements the visual pose solver 308 may be used to provide an initial pose or multiple initial poses.

Referring to FIG. 4, another exemplary motion data combiner 400 is illustrated that includes an integrated architecture. In particular, the functionality of the physical pose solver 306 and the visual pose solver 308 (shown in FIG. 3) are combined into a pose solver 402. As such, physical data 404 (e.g., provided by the inertial sensors of the body suit 102) and visual data 406 (e.g., provided by the exemplary camera 206) are both provided to the pose solver 402. In this integrated approach, one or more operations (e.g., optimization operations) are executed by the pose solver 402 to identify the pose that appropriately represents movement information provided by both the inertial sensors (e.g., provided by the physical data 404) and the camera 206 (e.g., provided by the visual data 406). Once identified, a pose estimate (for a particular frame) is provided by the pose solver 402 and physical data and visual data associated with a subsequent frame are received for processing and pose estimation. While distributed and combined architectures are provided in FIGS. 3 and 4, some implemented architectures may provide additional functionality. For example, pose estimates may be used to improve error detection and tracking markers of objects being captured, cameras, etc.

In some arrangements, a motion data combiner may operate on data from multiple frames to solve for a pose. For example, physical and visual data collected over a predefined period of time (e.g., a predefined number of frames) may be used for determining one or more poses, or refining a particular pose multiple poses. The equivalent number of frames of physical and visual data may or may not be used for determining a pose. For example, visual data from a significant number frames may be used with relatively smaller amount of physical data, or vice versa. By using multiple frames, information from previous frames can be used to solve for a current pose. Motion information (e.g., velocity, acceleration, etc.) associated with a series of movements of a portion of an actor (e.g., a joint) can be used to solve for a current pose by implementing various signal processing techniques (e.g., applying a Kalman filter). In some arrangements, physical and visual data collected over a period of time (e.g., series of frames) may be used to simultaneously solve for a series of poses, however, such calculations may be processor and memory intensive.

Figure 5:
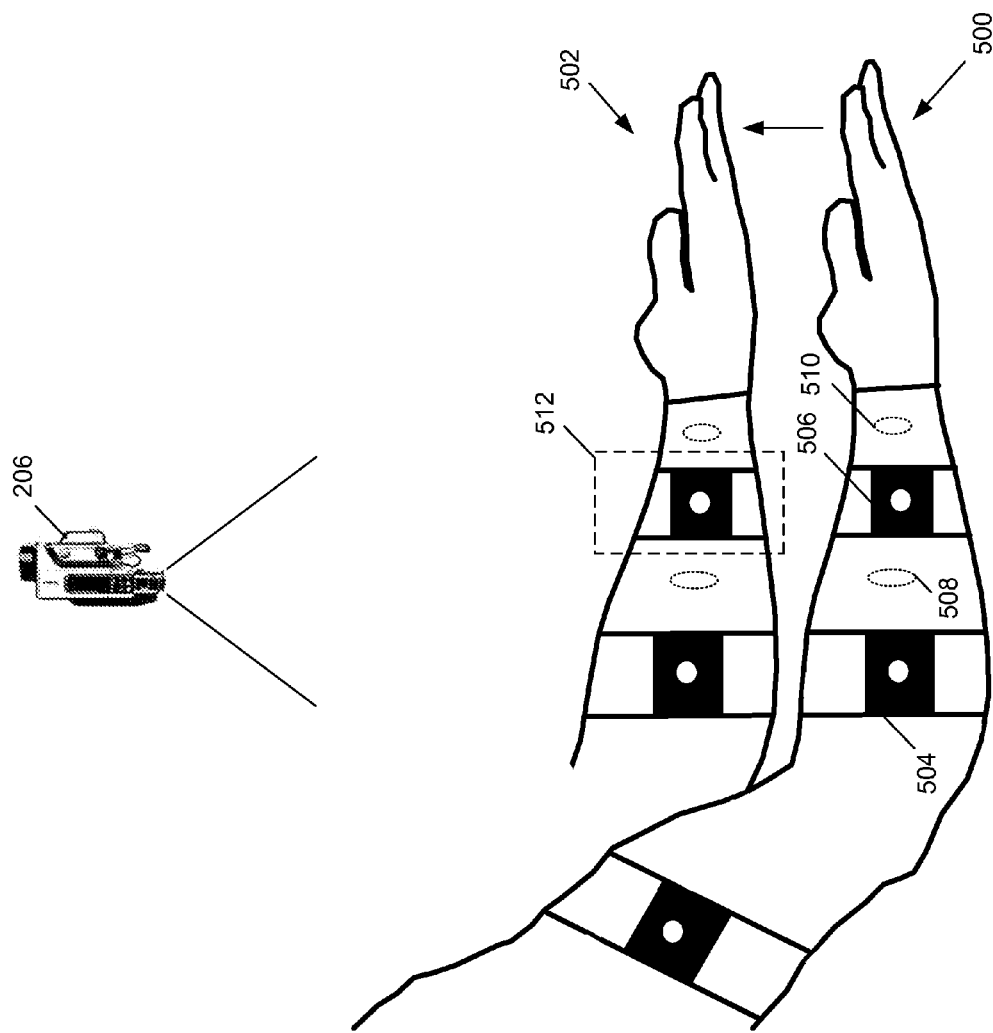
FIG. 5 illustrates exemplary movement of a motion capture body suit.

Referring to FIG. 5, a portion the actor's 100 arm is presented in two positions to illustrate movement over a period of time. In particular, over time, the arm moves from one position 500 to a second position 502, which is closer to the camera 206. However, based upon the camera's position and ability to capture 2D images, the slight forward movement of the arm may not register in the captured visual data. For example, the relative position and orientation of markers 504 and 506 do not significantly change (from the camera's perspective) as the arm moves from position 500 to position 502. As such, the visual motion sensing system 104 (e.g., that includes camera 206 and computer system 204) may not detect the arm move across the frames captured during the movement. However, inertial sensors 508 and 510, which are also respectively located on the actor's arm, can sense the acceleration due to the arm movement. Once sensed, data representative of the acceleration is provided by the inertial sensors 508, 510 to the physical data collector 206 and correspondingly provided to the computer system 204. From this physical data, the motion data combiner 210 can produce a 3D pose of the actor (including the arm) that accounts for the sensed acceleration.

By combining the data provided by these measurements, along with producing pose with increased accuracy, other applications may be improved. For example, the visual motion sensing system 104 may also be capable of tracking markers from frame to frame. By using the data provided by the inertial sensors, tracking may be improved along with system robustness. For example, the inertial sensors (e.g., sensors 508 and 510) may sense relatively slight physical movements (e.g., in a particular extremity) while tracking operations on the visual data register a substantial movement (perhaps in the course of just one frame). By using the inertial data to serve as a check and validate the visual data, erroneous tracking data may be detected and rejected.

In another application, the data from the inertial sensors may be used to determine the approximate location of markers in subsequent frames (e.g., to assist tracking) For example, based upon an initial marker position being identified (e.g., the location of marker 506 at arm position 500) and the motion sensed (e.g., due to the movement from arm position 500 to position 502) by the inertial sensors (e.g., sensors 508 and 510), the approximate location of the marker can be determined by the motion data combiner 210. As such, a region (associated with a subsequent pose or subsequent poses) may be identified for constraining a search for the marker 506 in subsequent frames. As highlighted with box 512, by constraining searching to the region, tracking may be efficiently improved for identifying marker location through a sequence of captured frames.

The information provided by the inertial sensors (and in combination with the visual information) may also to improve other aspects of tracking markers. For example, inertial information may be used to determine the appearance of the markers, relative to the perspective of the camera 206. Based upon the inertial information, the motion data combiner 210 can estimate the 2D shape of a marker captured by the camera 206. For example, a marker with a circular shape may appear elliptical as the marker moves away from the camera's field of view. Additionally, the information allows the motion data combiner 210 to predict which of the markers (e.g., being tracked) should appear in one or more captured images and which markers should be absent from the images (e.g., due to occlusion, grazing angle, etc.).

The motion information provided by the inertial sensors may also be used to initially identify markers for establishing a virtual representation of an object such as a skeleton. For systems that only use visual information for tracking markers, a virtual representation may need to be posed for a particular frame or a set of frames in order to establish a correspondence between points that form the virtual representation and the markers represented in the captured images. By using the data provided by the inertial sensors, the amount of virtual representation manipulations may be reduced. In general, the inertial sensor data can be used to adjust the virtual representation (e.g., the root position, orientation, etc.) to align with the image data from one frame. Alternatively, the image data could be adjusted by the inertial sensor data to align points of a virtual representation (being held fixed) to the adjusted image data. Once the image data and points of the virtual representation are aligned, the motion data combiner 210 could locate and label the markers by searching the 2D region associated with the projected locations of the markers. In some arrangements, further adjustments may be executed on the virtual representation. For example, if parameters associated with the virtual representation (e.g., skeleton parameters) or the marker positions (e.g., located on the body suit 102) are un-calibrated, the virtual representation may be adjusted and optimized to determine the marker locations (relative to the virtual representation). To further optimize the alignment, additional cameras may also be included in the visual motion sensing system 104 such that only one frame of data may be needed for the alignment.

In the scenarios described with respect to FIGS. 1 and 2, the inertial data (provided by the inertial sensors) and the visual data (provided by the markers) are collected from the performing actor 100. However, other objects (e.g., animals, vehicles, etc.) may also be fitted with markers and inertial sensors (e.g., via a body suit, fabric, etc.) for similar applications such as developing a virtual representation. The inertial sensors and may also be positioned on other objects such as one or more of the cameras (e.g., the camera 206) being used by the visual motion sensing system 104. For example, by positioning inertial sensors on the camera 206, and placing tracking markers on a fixed surface of the environment (e.g., a wall 214, shown in FIG. 2) within the camera's field of view, the position of the markers can be estimated from frame-to-frame. By measuring the fixed markers and the inertial data, movement of the camera 206 can be tracked, thereby assisting with the calibrating of the camera location. For arrangements in which sensors are not positioned on the camera 206, the markers of the body suit 102 can assist calibrating the position of the camera. In particular, the relative transformation between the subject (e.g., the actor 100 in the body suit 102) and the camera may be determined, however the global position may be subject to the vagaries of the physical motion sensing system (e.g., the inertial sensors). Markers may also be positioned in other locations to assist with camera calibration, for example, markers may be positioned in one or more stationary locations (e.g., fixed surfaces, rigid objects, etc.) and captured in images to determine the position of the camera or another object.

In still another arrangement, the motion data combiner 210 may estimate both the positions of an object (e.g., wearing a body suit with inertial sensors) and an inertially-tracked camera (or cameras). Such estimates may be mutual reinforcing, however, if the position of the camera or the object is needed with respect to another coordinate system (e.g., for another environment or object), a relationship provided by tracking fiducials captured by the camera or provided by the separate system may be needed.

Figure 6:
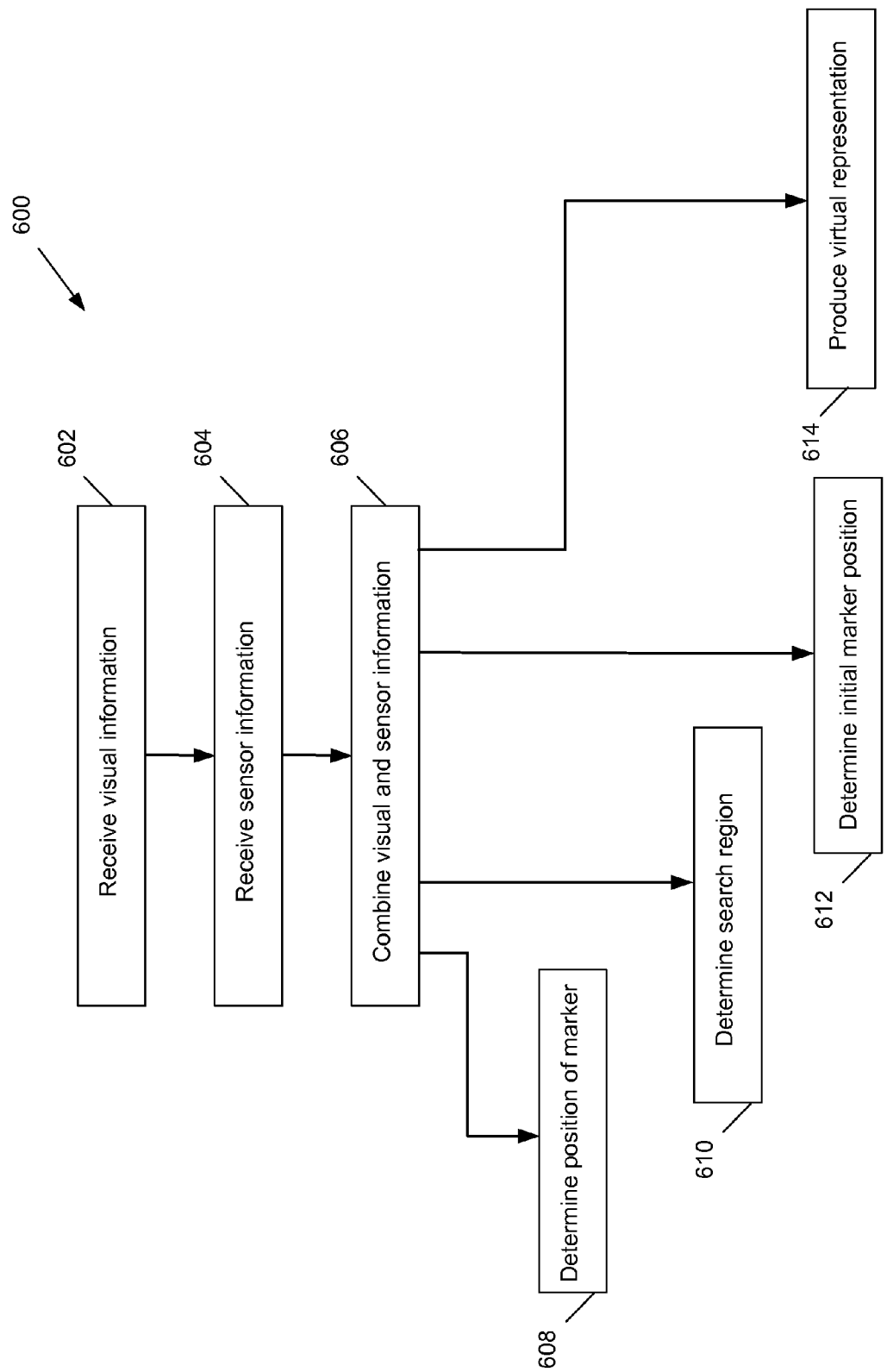
FIG. 6 illustrates exemplary operations of a motion data combiner.

Referring to FIG. 6, a flowchart 600 represents some of the operations of the motion data combiner 210. As mentioned, the operations may be executed by a single computer system (e.g., computer system 204) or multiple computing devices. Along with being executed at a single site (e.g., at one computer system), operation execution may be distributed among two or more sites.

Operations include receiving 602 visual information, for example, information may be received from the visual motion sensing system 104 (shown in FIG. 1) or a similar system such as the motion capture system described in United States Patent Application Publication US2006/0228101, titled "Three-Dimensional Motion Capture", filed 16 Mar. 2006 and published 12 Oct. 2006, which is incorporated by reference herein in its entirety. The received visual information can be provided from markers attached to a body suit that is being worn by a performer such as an actor. Operations of the motion data combiner 210 also include receiving 604 sensor information (e.g., inertial information), for example, from one or multiple inertial sensors attached to the body suit. In one particular arrangement, the inertial sensors are accelerometers that measure the local acceleration. Processing (e.g., integrating) the acceleration data allows position information local to the sensor to be determined.

Once the visual information and the sensor information has been received, operations include combining 606 the visual and sensor information. In some arrangements, to combine, operations such as synchronizing the two information sets is executed. For example, manual user operations, time codes and other methodologies and techniques may be implemented for synchronizing the information.

Once combined, operations include determining 608 the position of one or more of the markers from both information sources. For example, a global position of a marker (e.g., in an environment) can be provided by the visual information (e.g., from a motion capture system) and a relatively local position of the marker (e.g., based on localized movements) can be provided by the position information of the inertial sensor. In some arrangements, additional sources may provide position information, for example, a GPS receiver may be used to provide global position information. As mentioned, the combined position information may be used for locating the position of one or more points on a virtual representation of the captured object. For arrangements in which the markers are placed on a camera or other object types, similar position data may be attained similar applications (e.g., position calibration).

From the received visual and inertial information, operations may also include determining 610 one or more regions for marker searching. For example, position information from one or more inertial sensors can be used to define boundaries or constraints for search regions within the images and frames included in the visual information to locate markers. Such regions may be defined for frames collected during the time period that correspond to the collection period of the position information from the inertial sensors. Such regions may also be defined for marker searching and identification in one or more subsequent frames. Operations may also include determining 612 the initial position of a marker (or markers) from the position information provided by the inertial sensor. For example, the position of individual points included in a virtual representation (e.g., a skeleton) of the actor (or other object) may be adjusted based upon position information provided by one or more inertial sensors. Once adjusted, the virtual representation can be used to adjust the visual information for locating and labeling markers. Other operations may also include producing 614 a virtual representation (e.g., a skeleton pose) from the combined visual and inertial information.

To perform the operations described in flow chart 600, the motion data combiner 210 may perform any of the computer-implement methods described previously, according to one implementation. For example, a computer system such as computer system 204 (shown in FIG. 2) may execute operations of the motion data combiner 210. The computer system may include a processor (not shown), a memory (not shown), a storage device (e.g., storage device 212), and an input/output device (not shown). Each of the components may be interconnected using a system bus or other similar structure.

The processor is capable of processing instructions for execution within the computer system. In one implementation, the processor is a single-threaded processor. In another implementation, the processor is a multi-threaded processor. The processor is capable of processing instructions stored in the memory or on the storage device to display graphical information for a user interface on the input/output device.

The memory stores information within the computer system. In one implementation, the memory is a computer-readable medium. In one implementation, the memory is a volatile memory unit. In another implementation, the memory is a non-volatile memory unit.

The storage device is capable of providing mass storage for the computer system. In one implementation, the storage device is a computer-readable medium. In various different implementations, the storage device may be a floppy disk device, a hard disk device, an optical disk device, or a tape device.

The input/output device provides input/output operations for the computer system. In one implementation, the input/output device includes a keyboard and/or pointing device. In another implementation, the input/output device includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims.

What is claimed is:

1. A computer-implemented method comprising:
receiving first visual information for an object including information for a plurality of visual markers associated with the object, the first visual information being obtained from a a first image of the object, wherein the object comprises at least a first feature and a second feature, wherein each feature is associated with a visual marker from the plurality of visual markers, and wherein the object comprises at least one inertial sensor;
receiving first position-related information corresponding to the object, the first position-related information being wirelessly transmitted from the at least one inertial sensor of the object; wherein the first position-related information is synchronized with the first visual information;
generating a first virtual pose for the object using the first position-related information transmitted wirelessly from the at least one inertial sensor of the object and the first visual information for the object, wherein the first virtual pose of the object comprises a first position of the first feature and a first position of the second feature in a virtual representation of the object, and wherein the first position of the first feature and the first position of the second feature are based on the first position-related information transmitted wirelessly from the at least one inertial sensor of the object and the first visual information for the object;
receiving second visual information for the object, the second visual information being obtained from a second image of the object, wherein the second image is generated after the first image is generated;
receiving second position-related information corresponding to the object, the second position-related information being wirelessly transmitted from the at least one inertial sensor of the object; and
generating a second virtual pose for the object using the second position-related information and the second visual information for the object, wherein the second virtual pose of the object comprises a second position of the first feature and a second position of the second feature in the virtual representation of the object.

2. The computer-implemented method of claim 1, wherein the object is capable of covering a portion of a body.

3. The computer-implemented method of claim 1, wherein the virtual representation of the object is a character in a video game.

4. The computer-implemented method of claim 1, wherein the first position-related information includes orientation information local to the inertial sensor.

5. The computer-implemented method of claim 1, wherein generating the second virtual pose for the object further comprises estimating the second position of the first feature using the first position of the first feature and the second position-related information.

6. The computer-implemented method of claim 5, wherein estimating the second position of the first feature further uses motion information of the object wirelessly transmitted from the at least one inertial sensor.

7. The computer-implemented method of claim 1, wherein the first image of the object is produced by a camera, and further comprising receiving third position-related information corresponding to the camera that is wirelessly transmitted from an inertial sensor associated with the camera, wherein the third position-related information corresponding to the camera is used in generating a second virtual pose for the object.

8. A system, comprising:
a visual data collector capable of obtaining first visual information of an object, the first visual information being obtained from a first image of the object, the object comprising a plurality of visual markers, at least one inertial sensor, and at least a first feature and a second feature, wherein each feature is associated with a visual marker of the plurality of visual markers;
a physical data collector capable of receiving first position-related information that corresponds to the first visual information and that is wirelessly transmitted by the at least one inertial sensors, where in the first position-related information is synchronized with the first visual information; and
a computer system including a pose solver capable of combining the first visual information and the position-related information, wherein the pose solver is configured to execute a method comprising:
generating a first virtual pose for the object using the first position-related information and the first visual information for the object, wherein the first virtual pose of the object comprises a first position of the first feature and a first position of the second feature in a virtual representation of the object;
receiving second visual information for the object, the second visual information being obtained from a second image of the object, wherein the second image is generated after the first image is generate;
receiving second position-related information corresponding to the object, the second position-related information being wirelessly transmitted from the at least one inertial sensor of the object; and
generating a second virtual pose for the object using the second position-related information and the second visual information for the object, wherein the second virtual pose of the object comprises a second position of the first feature and a second position of the second feature in the virtual representation of the object.

9. The system of claim 8, wherein the object is capable of covering a portion of a body.

10. The system of claim 8, wherein the virtual representation of the object is a character in a video game.

11. The system of claim 8, wherein the first position-related information includes orientation information local to the inertial sensor.

12. The system of claim 8, wherein generating a second virtual pose for the object further comprises estimating the second position of the first feature using the first position of the first feature and the second position-related information.

13. The system of claim 12, wherein estimating the second position of the first feature further uses motion information of the object wirelessly transmitted from the at least one inertial sensor.

14. The system of claim 8, wherein the first image of the object is produced by a camera, and further comprising receiving third position-related information corresponding to the camera that is wirelessly transmitted from an inertial sensor associated with the camera, wherein the third position-related information corresponding to the camera is used in generating a second virtual pose for the object.

15. A computer program product tangibly embodied in an non-transitory computer readable medium and comprising instructions that when executed by a processor perform a method comprising:
receiving first visual information for an object including information for a plurality of visual markers associated with the object, the first visual information being obtained from a first image of the object, wherein the object comprises at least a first feature and a second feature, wherein each feature is associated with a visual marker from the plurality of visual markers, and wherein the object comprises at least one inertial sensor;
receiving first position-related information corresponding to the object, the first position-related information being wirelessly transmitted from the at least one inertial sensor of the object, wherein the first position-related information is synchronized with the first visual information;
generating a first virtual pose for the object using the first position-related information transmitted wirelessly from the at least one inertial sensor of the object and the first visual information for the object, wherein the first virtual pose of the object comprises a first position of the first feature and a first position of the second feature in a virtual representation of the object, and wherein the first position of the first feature and the first position of the second feature are based on the first position-related information transmitted wirelessly from the at least one inertial sensor of the object and the first visual information for the object;
receiving second visual information for the object, the second visual information being obtained from a second image of the object, wherein the second image is generated after the first image is generated;
receiving second position-related information corresponding to the object, the second position-related information being wirelessly transmitted from the at least one inertial sensor of the object; and
generating a second virtual pose for the object using the second position-related information and the second visual information for the object, wherein the second virtual pose of the object comprises a second position of the first feature and a second position of the second feature in the virtual representation of the object.

16. The computer program product of claim 15, wherein the object is capable of covering a portion of a body.

17. The computer program product of claim 15, wherein generating a second virtual pose for the Object further comprises estimating the second position of the first feature using the first position of the first feature and the second position-related information.

* * * * *